United States Patent Office 3,487,095
Patented Dec. 30, 1969

3,487,095
OCTA-$\mu_3$-HALO AND ALKOXY HEXAMOLYBDENUM(II) ALKOXIDES
Piero Luigi Nannelli, King of Prussia, and Burton Peter Block, Wayne, Pa., assignors to Pennwalt Corporation, a corporation of Pennsylvania
No Drawing. Filed Dec. 28, 1967, Ser. No. 694,060
Int. Cl. C07f 11/00; C08g 22/40; B01j 11/06
U.S. Cl. 260—429                    7 Claims

ABSTRACT OF THE DISCLOSURE

Compounds of structure $M_y[Mo_6X_{8-n}(OR)_n](OR)_{4+y}$ where M is an alkali metal, X is halogen, R is alkyl or aryl, y is an integer of from 0 to 2, and n is an integer of from 0 to 8. The compounds are useful as specific catalysts for the preparation of polyurethanes.

---

Molybdenum (II) halides are typical examples of metal cluster compounds. Although often written as $MoX_2$, they are more correctly formulated as $(Mo_6X_8)X_4$, where X is halogen such as Cl, Br, and I, and are named octa-$\mu_3$-halohexamolybdenum (II) halides. The molybdenum atoms lie at the center of each face of a cube formed by eight chlorine atoms. The resulting $(Mo_6X_8)^{4+}$ group shows a remarkable stability toward a variety of chemical agents, even at high temperature. Compounds of this type are discussed in the article by J. C. Sheldon in Nature, Oct. 17, 1959, vol. 184; pp. 1210 to 1213.

In accord with the invention compounds are provided which have the formula:

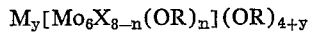

where M is an alkali metal, X is halogen, R is alkyl (one to twelve carbon atoms), or aryl (e.g., phenyl, naphthyl, etc.), y is an integer of from 0 to 2, and n is an integer of from 0 to 8.

Compounds of the above formula are readily made by reaction of the molybdenum halides with various amounts of alcoholic metal alkoxides. The alcohol used will correspond to the alkoxy group to be introduced. Thus where a methoxide derivative is made, a solution of alkali metal methoxide in methanol will be the reagent. This procedure is preferred when R in the above formula is lower alkyl (e.g., alkyl of one to three carbon atoms).

The cluster compounds of structure

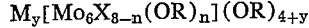

where R is lower alkyl, may be reacted further with an alcohol whereby the alkoxy portion of the alcohol replaces part or all of the alkoxy portions of the compound.

Reaction with phenols readily affords compounds of structure $M_y[Mo_6X_{8-n}(OR)_n](OR)_{4+y}$, where R is either aryl or aryl and alkyl. This exchange procedure is also to be preferred where the R groups are higher alkyl. In this exchange process the exchange with the alkoxyl groups outside the cluster occurs most readily, requiring only sufficient heating to distill off the displaced alcohol. To exchange (partially or completely) the alkoxy groups within the cluster requires more vigorous reaction conditions. The compounds of the invention are useful as specific catalysts for the preparation of polyurethanes.

Examples of the compounds and their preparation follows:

EXAMPLE I

Preparation of sodium octa-$\mu_3$-chlorohexamolybdenum (II) methoxide

To a slurry of 30 g. of $(Mo_6Cl_8)Cl_4$ in 40 ml. of anhydrous methanol a solution of sodium methoxide, made from 6.9 g. of sodium in 100 ml. of methanol, was slowly added with stirring. The reaction mixture was stirred at room temperature for about 0.5 hour; then 100 ml. of anhydrous ether was added in order to precipitate more completely the NaCl by-product, which was removed by filtration. To the clear filtered solution 850 ml. of ether was added. The resulting crystalline yellow precipitate was filtered, washed with methanol-ether (1:20 ratio) solution, then with ether, and dried under vacuum at room temperature to constant weight. Yield 27.1 g. The product is soluble in both alcohols and water, but it is readily decomposed to chloromolybdenum (II) hydroxides in the latter.

Analysis.—Calcd. for $Na_2(Mo_6Cl_8)(OCH_3)_6$: Mo, 52.7; Cl, 25.9; C, 6.60; H, 1.66; Na, 4.21. Found: Mo, 52.5; Cl, 25.8; C, 6.46; H, 1.66; Na, 4.1.

An infrared spectrum of the compound showed a strong C—O stretching band at 1045 cm.$^{-1}$ and a strong Mo—O stretching band at 460 cm.$^{-1}$.

EXAMPLE II

Preparation of sodium octa-$\mu_3$-bromohexamolybdenum (II) methoxide

To a slurry of 15 g. of $(Mo_6Br_8)Br_4$ in 20 ml. of anhydrous methanol, sodium methoxide solution made from 2.0 g. of sodium in 30 ml. of methanol was added with stirring. The reaction mixture was then heated, with stirring, up to the reflux temperature and filtered while still hot. The clear solution on cooling separated a reddish crystalline compound which was collected on a filter, washed with ether-methanol (9:1 ratio) solution, then with ether, and dried under vacuum at 100° C. Yield 6.8 g.

Analysis.—Calcd. for $Na_2[Mo_6Br_8](OCH_3)_6$: Mo, 39.78; Br, 44.17; C, 4.98; H, 1.25; Na, 3.17. Found: Mo, 40.21; Br, 43.06; C, 5.24; H, 1.43; Na, 3.34.

EXAMPLE III

Preparation of sodium octa-$\mu_3$-methoxyhexamolybdenum (II) methoxide

To a slurry of 30 g. of $(Mo_6Cl_8)Cl_4$ in 50 ml. of anhydrous methanol a solution of sodium methoxide, made from 12 g. of sodium in 200 ml. of methanol, was slowly added with stirring. All the methanol solvent was then distilled off and the residue kept for 2.5 hours in an oil bath heated at 140° C. while a slow stream of dry oxygen-free nitrogen was passed through the reaction flask. All the subsequent operations were also performed under nitrogen, with solvents previously purged with nitrogen. After the residue cooled, 50 ml. of methanol was added. To the resulting slurry of NaCl in a chocolate-brown solution was added 100 ml. of anhydrous ether and the mixture was then filtered to remove the NaCl by-product. To the clear solution was added one liter of ether, and the resulting brown precipitate was filtered, washed with ether-methanol (9:1 ratio), and then with ether. After the compound had dried under vacuum at room temperature, it weighed 9.3 g. The product is soluble in alcohols. It decomposes in water and ignites upon exposure to atmospheric oxygen.

Analysis.—Calcd. for $Na_2[Mo_6(OCH_3)_8](OCH_3)_6$: Mo, 54.5; C, 15.92; H, 4.00; Na, 4.35. Found: Mo, 55.2; C, 15.2; H, 4.2; Na, 5.1.

It will be understood, of course, that instead of sodium methoxide in the above examples, potassium ethoxide, sodium isopropoxide, lithium butoxide, and similar alkoxides of amyl and hexyl alcohols may be used. Likewise a variety of molybdenum (II) halides may be used.

EXAMPLE IV

Preparation of octa-$\mu_3$-chlorohexamolybdenum (II) ethoxide $[Mo_6Cl_8](OC_2H_5)_4$ A solution of 30 g. of $Na_2[Mo_6Cl_8](OC_2H_5)_6$ in 500 ml. of absolute ethanol was refluxed for fifteen hours under a slow stream of nitrogen. About 250 ml. of solvent was then distilled off over a four-hour period. To the filtered residue 500 ml. of dry ether was added. A brown powder precipitated, which was filtered, washed with ether, and dried at room temperature under vacuum. Yield 5.7 g.

*Analysis.*—Calcd. for $[Mo_6Cl_8](OC_2H_5)_4$: C, 9.2; H, 1.9. Found: C, 9.2; H, 2.2.

EXAMPLE V

Preparation of sodium octa-$\mu_3$-chlorohexamolybdenum (II) hexaethoxide $Na_2[Mo_6Cl_8](OC_2H_5)_6$ A solution of 11.5 g. of sodium in 175 ml. of absolute ethanol was slowly added to 60 g. of $[Mo_6Cl_8]Cl_4$ in 50 ml. of ethanol. The resulting yellow-orange suspension was stirred at 40° C. for one hour and then filtered. To the clear solution 600 ml. of dry ether was added. A yellow crystalline compound precipitated, which was filtered, washed with ether-ethanol solution (9:1 ratio), then with ether, and dried under vacuum at 50° C. Yield 38.0 g.

*Analysis.*—Calcd. for $Na_2[Mo_6Cl_8](OC_2H_5)_6$: Mo, 48.9; Cl, 24.1; C, 12.25; H, 2.57; Na, 3.9. Found: Mo, 48.2; Cl, 24.1; C, 12.38; H, 2.94; Na, 4.0.

EXAMPLE VI

Preparation of octa-$\mu_3$-chlorohexamolybdenum (II) isopropoxide $[Mo_6Cl_8][OCH(CH_3)_2]_4$ A solution of 16.35 g. of $Na_2[Mo_6Cl_8](OCH_3)_6$ in 350 ml. of isopropyl alcohol was refluxed for one hour stirring and under a stream of dry nitrogen. About 300 ml. of solvent was then distilled off over a 7-hour period. The residue was filtered and to the clear solution 300 ml. of ether was added. A brown compound precipitated, which was filtered, washed with ether containing a small amount of isopropanol and then with pure ether. After drying the compound weighed 7.0 g.

*Analysis.*—Calcd. for $[Mo_6Cl_8][OCH(CH_3)_2]_4$: Mo, 52.5; C, 13.15; H, 2.57. Found: Mo, 53.3; C, 11.96; H, 2.58.

EXAMPLE VIII

Preparation of sodium octa-$\mu_3$-chlorohexamolybdenum (II) hexaisopropoxide $Na_2[Mo_6Cl_8][OCH(CH_3)_2]_6$ A solution of 3.0 g. of sodium in 100 ml. of isopropyl alcohol was added to a slurry of 20 g. of $[Mo_6Cl_8]Cl_4$ in 25 ml. of the same alcohol. After stirring for two hours, under nitrogen, the reaction mixture was filtered and the clear solution evaporated to a small volume by heating under reduced pressure. To the viscous orange-red residue 300 ml. of ether was added. This resulted in the formation of a yellow precipitate which was filtered, washed with ether and then dried under vacuum at room temperature. Yield 10.3 g.

*Analysis.*—Calcd. for $Na_2[Mo_6Cl_8][OCH(CH_3)_2]_6$: C, 17.02; H, 3.33; Na, 3.6. Found: C, 16.28; H, 4.27; Na, 3.5.

EXAMPLE VIII

Preparation of sodium octa-$\mu_3$-chlorohexamolybdenum (II) hexaphenoxide $Na_2[Mo_6Cl_8](OC_6H_5)_6$ To a solution of 33.0 g. of $Na_2[Mo_6Cl_8](OCH_3)_6$ in 70 ml. of methanol, a solution of 18.8 g. of phenol in 150 ml. of dioxane was added with stirring under a stream of nitrogen. The reaction flask was then placed in an oil bath heated at 120–130° C. and 120 ml. of solvent was distilled off. The reaction mixture at this point was a yellow crystalline mass. After cooling, 100 ml. of dioxane was added and the compound filtered, washed with dioxane and then with ether. It was dried by heating at 150–160° C. under vacuum. Yield 40.7.

*Analysis.*—Calcd. for $Na_2[Mo_6Cl_8](OC_6H_5)_6$: C, 29.5; H, 2.06. Found: C, 28.6; H, 2.30.

EXAMPLE IX

Preparation of hepta-$\mu_3$-ethoxy-$\mu_3$-phenoxyhexamolybdenum (II) phenoxide $[Mo_6(OC_2H_5)_7(OC_6H_5)](OC_6H_5)_4$ A solution of 9.4 g. of phenol in 160 ml. of toluene was added to a solution of 8 g. of $$Na_2[Mo_6(OC_2H_5)_8](OC_2H_5)_6$$

in 30 ml. of absolute ethanol. About 65 ml. of solvent was then distilled off. The reaction mixture was filtered and an additional 60 ml. of solvent was distilled off from the clear solution. All these operations were performed under nitrogen. By standing for two days the reaction mixture separated a thick oily precipitate, which became solid upon addition of 400 ml. of ether. The precipitate was filtered, washed with ether and dried at 100° C. under vacuum. Yield 2.4. g.

*Analysis.*—Calcd. for $$[Mo_6(OC_2H_5)_7(OC_6H_5)](OC_6H_5)_4:$$

C, 38.9; H, 4.4. Found: C, 37.7; H, 3.3.

EXAMPLE X

Preparation of sodium penta - $\mu_3$ - chloro - tri - $\mu_3$-methoxy - hexamolybdenum (II) pentamethoxide $Na[Mo_6Cl_5(OCH_3)_3](OCH_3)_5$ A solution of 5.52 g. (0.24 mole) of sodium in 150 ml. of methanol was added to a slurry of 30 g. (0.030 mole) of $[Mo_6Cl_8]Cl_4$ in 50 ml. of MeOH. After stirring at room temperature for about one hour the methanol solvent was distilled off by heating with an oil bath at 115° C., with stirring and under nitrogen. All the subsequent operations were also performed under a slow stream of nitrogen. The residue was then heated at 140° C. for one half hour. After cooling, 50 ml. of methanol was added and then distilled off as before. This step was repeated, and the reaction mixture was finally heated at 145° C. for two and one half hours. After cooling, 50 ml. of methanol was added and the dark brown suspension filtered. To the clear solution 100 ml. of ether was added. A brown powder-like compound precipitated. After standing for about three hours the precipitate was collected on a fritted glass funnel, washed with ether-methanol solution (2:1 ratio), then with ether, and dried at room temperature under vacuum. Yield 5.8 g.

*Analysis.*—Calcd. for $Na[Mo_6Cl_5(OCH_3)_3](OCH_3)_5$: Mo, 56.2; Cl, 17.3; C, 9.3; H, 2.3; Na, 2.2. Found: Mo, 55.4; Cl, 16.0; C, 8.9; H, 2.6; Na, 2.3.

As indicated, the compounds of the invention are useful as specific catalysts for the preparation of polyurethanes. In preparing polyurethanes, as for example, poly(1,4-butylene hexamethylene carbamate), an alkylene diisocyanate and a diol are reacted for a period of time at elevated temperatures (generally reflux temperatures of over 100° C.). This is illustrated by the synthesis of poly(1,4-butylene hexamethylene carbamate) given in "Macromolecular Syntheses,", vol. 1, pp. 69 to 72, which procedure follows:

Hexamethylene diisocyanate (51.5±0.1 g., 0.3065 mole) is weighed directly into a dry reactor, and the air in the vessel is again displaced by dry nitrogen. The reactor is a 1 l., three-necked, round-bottomed flask with ground glass joints, equipped with a thermometer, an agitator sealed to prevent access of air, a Friedrichs condenser with a drying tube on the outlet, and a heating mantle. Dry monochlorobenzene (0.2 l.) is added. Gentle agitation is started, and the mixture is heated to 100° C. Anhydrous 1,4-butanediol (27.0±0.1 g., 0.3000 mole) is added by weighing in all but 1–2 g. by difference from a small glass-stoppered Erlenmeyer flask, then adding the remainder volumetrically from a hypodermic syringe calibrated in 0.1 cc. division. The mixture is heated to the reflux temperature, 132–134° C., in about 20 minutes after the 1,4-butanediol is added, and maintained under reflux. After about 30–40 minutes from the time the reflux temperature is reached the solution becomes cloudy, indicating separation of polymer. Heating is continued for 75 minutes at the reflux temperature after the cloudiness first appears. During this time the polymer precipitates. The slurry is filtered while it is at a temperature above 100° C., and the polymer is collected in a 3-inch Buchner funnel, Fisher Scientific Company semicrimped, rapid, qualitative filter paper No. 9-795 or equivalent being used. The polymer is compressed and sucked as dry as possible on the filter. Then it is washed twice with 0.2 l. portions of water to flush out most of the remaining monochlorobenzene. The filter cake is returned to the reactor, 0.2 l. of water is added, and the position of the condenser is changed for take-off. The slurry is agitated to prevent bumping and foaming, and the reactor is heated with an oil bath maintained at 115° C. to remove the remaining monochlorobenzene by steam distillation, until the distillate is not cloudy. The polymer is filtered as before and dried under a pressure of 10 mm. at 75° C. for 18 hours. The resulting fine white powder has a flow point in a capillary melting-point tube of 174–178° C. The intrinsic viscosity in m-cresol at 25° C. is in the range of 0.57–1.26. The yield is 69–74 g., 88–95%.

The compounds of the invention, however, are catalysts for the above polymerization procedure and permit synthesis of the polymer at significantly higher rates and without external heating since the reaction becomes exothermic. This is illustrated by the following examples:

EXAMPLE XI

Preparation of poly(1,4-butylene hexamethylene carbamate) using $Na_2[Mo_6Cl_8](OC_2H_5)_6$ as a catalyst Hexamethylene diisocyanate (8.6 g., 51 mmoles) was dissolved in 50 ml. of chlorobenzene and the solution stirred and heated at 100° C. under a slow stream of dry nitrogen. A solution of 0.217 g. (0.184 mmole) of $Na_2[Mo_6Cl_8](OC_2H_5)_6$ in 4.5 g. (50 mmoles) of 1,4-butanediol was then added. An exothermic reaction took place in a few seconds, the temperature rising sufficiently for the chlorobenzene to reflux (132° C.). Precipitation of the polymer followed immediately. After the mixture cooled to room temperature, the solvent was poured off. The polymer partially dissolved in 400 ml. of m-cresol (a relatively small amount remained as a gel) and was precipitated by adding 1500 ml. of methanol. After it was filtered off and washed with methanol, the precipitate was again treated with 400 ml. of m-cresol and reprecipitated with 1500 ml. of methanol. The polymer was then washed with methanol and ether and dried under vacuum (0.1 mm.) at 75° C. to constant weight. Yield 10.5 g. (80%).

Analysis.—Calcd. for

C, 55.79; H, 8.58; N, 10.84. Found: C, 55.25; H, 8.69; N, 10.68. [η]=1.02 (in m-cresol at 30° C.).

EXAMPLE XII

Preparation of poly(1,4-butylene hexamethylene carbamate) using $Na_2[Mo_6(OC_2H_5)_8](OC_2H_5)_6$ as a catalyst The reaction was performed in a manner analogous to the preceding example, by adding a solution of 0.286 g. (0.228 mmole) of $Na_2[Mo_6(OC_2H_5)_8](OC_2H_5)_6$ in 4.5 g. of 1,4-butanediol to a stirred solution of 8.6 g. of hexamethylene diisocyanate, in 50 ml. of chlorobenzene heated to 100° C. under nitrogen. The same immediate exothermic effect was observed, with subsequent precipitation of the polymer. Analogous workup gave 11.0 g. (84%) of polymer.

Analysis.—Calcd. for

C, 55.79; H, 8.58; N, 10.84. Found: C, 55.30; H, 8.57; N, 10.90. [η]=0.57 (in m-cresol at 30° C.).

EXAMPLE XIII

Preparation of poly(1,4-butylene hexamethylene carbamate) using 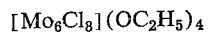 as a catalyst The reaction was performed as in the preceding examples, by adding a solution of 225 mg. of $$[Mo_6Cl_8](OC_2H_5)_4$$

in 4.5 g. of 1,4-butanediol to a solution of 8.6 g. of hexamethylene diisocyanate, in 50 ml. of chlorobenzene heated at 100° C. An exothermic reaction occurred after a few seconds with precipitation of the polymer.

EXAMPLE XIV

Preparation of poly(1,4-butylene hexamethylene carbamate) using $Na_2[Mo_6Cl_8](OCH_3)_6$ as a catalyst—no solvent A solution of 198 mg. of $Na_2[Mo_6Cl_8](OCH_3)_6$ in 4.5 g. of 1,4-butanediol was added with stirring to 8.6 g. of hexamethylene diisocyanate, at room temperature. An exothermic reaction took place, the temperature rising up to about 100° C. in about 15 minutes. The reaction mixture was then a hard polymeric mass.

An analogous experiment was carried out, but without the catalyst. No exothermic effect was observed and only a fraction of the reaction mixture had polymerized after seven hours of stirring at room temperature.

EXAMPLE XV

Preparation of poly(1,4-butylene hexamethylene carbamate) using $[Mo_6(OC_2H_5)_7(OC_6H_5)](OC_6H_5)_4$—no solvent The reaction was performed in a manner analogous to the preceding example, by adding a solution of 210 mg. of $[Mo_6(OC_2H_5)_7(OC_6H_5)](OC_6H_5)_4$ in 4.5 g. of 1,4-butanediol to 8.6 g. of hexamethylene diisocyanate. An exothermic reaction took place immediately with separation of the polymer.

We claim:
1. Compounds characterized by the formula

$$M_y[Mo_6X_{8-n}(OR)_n](OR)_{4xy}$$

where M is an alkali metal, X is halogen, R is alkyl or aryl, y is an integer from 0 to 2, and n is an integer from 0 to 8.

2. Sodium octa-$\mu_3$-chlorohexamolybdenum(II) methoxide.
3. Sodium octa-$\mu_3$-methoxyhexamolybdenum(II) methoxide.
4. Sodium octa-$\mu_3$-chlorohexamolybdenum(II) hexaphenoxide.
5. Octa-$\mu_3$-chlorohexamolybdenum(II) ethoxide.
6. Hepta-$\mu_3$-ethoxy-$\mu_3$-phenoxy - hexamolybdenum(II) phenoxide.
7. Octa-$\mu_3$-chlorohexamolybdenum(II) isopropoxide.

References Cited

UNITED STATES PATENTS 2,229,528   1/1914   Shoemaker _____ 252—35

OTHER REFERENCES

Mellor: Comprehensive Treatise on Inorganic and Theoretical Chemistry, Longmans, Green and Co., London, 1931, vol. 11, pp. 616–619.

TOBIAS E. LEVOW, Primary Examiner

A. P. DEMERS, Assistant Examiner

U.S. Cl. X.R.

252—431; 260—77.5